US006482872B2

(12) United States Patent
Downie

(10) Patent No.: US 6,482,872 B2
(45) Date of Patent: *Nov. 19, 2002

(54) PROCESS FOR MANUFACTURING A BIODEGRADABLE POLYMERIC COMPOSITION

(75) Inventor: Robert H. Downie, Williamsville, NY (US)

(73) Assignee: Programmable Materials, Inc., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/539,861

(22) Filed: Mar. 30, 2000

(65) Prior Publication Data

US 2001/0027225 A1 Oct. 4, 2001

Related U.S. Application Data

(60) Provisional application No. 60/127,793, filed on Apr. 1, 1999.

(51) Int. Cl.⁷ .................................................. C08H 5/00
(52) U.S. Cl. ....................... 523/124; 523/125; 523/126; 523/128
(58) Field of Search ............................... 523/124, 125, 523/126; 525/330.6, 370, 936, 333.8; 528/486, 487, 485, 502 F; 526/914, 82, 83, 352

(56) References Cited

U.S. PATENT DOCUMENTS

| | | | | |
|---|---|---|---|---|
| 2,435,769 A | * | 2/1948 | Cheyney et al. | 524/399 |
| 2,446,976 A | * | 8/1948 | Cousins | 524/399 |
| 2,669,548 A | * | 2/1954 | Darby et al. | 524/399 |
| 3,297,479 A | * | 1/1967 | Burgess et al. | 524/304 |
| 3,647,111 A | * | 3/1972 | Stager et al. | 523/125 |
| 3,825,626 A | * | 7/1974 | McGaugh | 523/124 |
| 3,825,627 A | * | 7/1974 | McGaugh | 523/125 |
| 3,840,512 A | | 10/1974 | Brackman | 260/94.9 |
| 3,856,747 A | * | 12/1974 | Dibiasi | 524/304 |
| 3,941,759 A | | 3/1976 | Taylor et al. | 260/92.8 |
| 3,978,033 A | * | 8/1976 | Gontarz et al. | 523/125 |
| 3,994,855 A | | 11/1976 | Boberg | 260/42.46 |
| 4,056,499 A | * | 11/1977 | Taylor | 523/124 |
| 4,101,720 A | | 7/1978 | Taylor et al. | 526/3 |
| 4,156,666 A | | 5/1979 | Odate et al. | 260/23 |
| 4,256,851 A | | 3/1981 | Taylor et al. | 525/1 |
| 4,360,606 A | | 11/1982 | Tobias et al. | 523/124 |
| 4,461,853 A | | 7/1984 | Gilead et al. | 523/126 |
| 4,476,255 A | | 10/1984 | Bailey et al. | 523/125 |
| 4,517,318 A | | 5/1985 | Miyoshi et al. | 523/126 |
| 4,833,209 A | | 5/1989 | Beijleveld et al. | 525/298 |
| 4,931,488 A | | 6/1990 | Chiquet | 523/126 |
| 4,983,645 A | | 1/1991 | Schwab | 522/47 |
| 5,045,577 A | * | 9/1991 | Mulhaupt et al. | 524/99 |
| 5,091,262 A | | 2/1992 | Knott et al. | 428/516 |
| 5,096,939 A | | 3/1992 | Mor | 523/125 |
| 5,134,193 A | | 7/1992 | Scwab | 525/57 |
| 5,145,779 A | | 9/1992 | Pometto, III et al. | 435/262 |
| 5,258,422 A | | 11/1993 | Chang et al. | 523/124 |
| 5,308,906 A | | 5/1994 | Taylor et al. | 524/398 |
| 5,324,798 A | * | 6/1994 | Sanders et al. | |
| 5,378,738 A | | 1/1995 | Deguchi et al. | 435/262 |
| 5,444,107 A | | 8/1995 | Ajioka et al. | 523/124 |
| 5,461,093 A | | 10/1995 | Yoo et al. | 524/47 |
| 5,565,503 A | | 10/1996 | Garcia et al. | 523/124 |
| 5,741,452 A | | 4/1998 | Ryan et al. | 264/209.5 |
| 5,804,304 A | * | 9/1998 | Williams et al. | 528/483 |
| 5,811,161 A | | 9/1998 | Jöves et al. | 428/34.3 |
| 5,854,304 A | | 12/1998 | Garcia et al. | 523/124 |
| 5,861,461 A | | 1/1999 | Lee et al. | 525/54.26 |
| 5,866,634 A | | 2/1999 | Tokushige et al. | 523/124 |
| 5,973,024 A | | 10/1999 | Imashiro et al. | 523/124 |
| 6,022,946 A | * | 2/2000 | McCullough | |

FOREIGN PATENT DOCUMENTS

| | | |
|---|---|---|
| WO | WO 88/09354 | 12/1988 |
| WO | WO 92/11298 | 7/1992 |
| WO | WO 94/13735 | 6/1994 |

OTHER PUBLICATIONS

Degradation and Stabilization of Polyoletins–8–27, 42–5379–81, 102, 103, 116–126, ed. Norman S. Allen Applied Science Publishers, N.Y. (1983).*

* cited by examiner

Primary Examiner—Peter Szekely
(74) Attorney, Agent, or Firm—Anthony R Barkume

(57) ABSTRACT

A process for manufacturing polymers containing a degradant component that increases the rate of polymer degradation. The process involves adding a degradant component to a fluid polymer immediately after the polymer is synthesized and while the polymer is still fluid to form a blend of the fluid polymer component and degradant component and mixing the blend of the fluid polymer component and degradant component to distribute the degradant component substantially homogeneously throughout the fluid polymer component.

25 Claims, No Drawings

PROCESS FOR MANUFACTURING A BIODEGRADABLE POLYMERIC COMPOSITION

CROSS REFERENCE TO RELATED APPLICATIONS

This application claims priority to provisional application 60/127,793, filed Apr. 1, 1999, currently pending.

TECHNICAL FIELD

The present invention relates to a process for preparing a polymer component that contain one or more degradants to facilitate degradation of the polymer component.

BACKGROUND ART

The use of plastics has given rise to improved methods of packaging goods. For example, polyethylene and polypropylene plastic films, bags, bottles, Styrofoam cups, blister packages, and the like provide stable, relatively unbreakable, chemically resistant light weight packaging. Conventional plastics used for packaging include, for example, polyethylene, polypropylene, polystyrene, polyethylene terphthalate, and polyvinyl chloride. Plastics have also found wide spread use in other disposable products such as, for example, disposable personal care products such as diapers, disposable work garments, and other disposable garments. The many advantages of plastics has lead to their increased usage in a variety of products. This increased usage, however, has created a serious environmental problem, since the plastic must be disposed of after it is used. As a result of the stability and durability of plastics, however, they tend to remain in our environment without decomposing after disposal. It has been estimated that over 50 percent of the annual tonnage of all manufactured synthetic polymers are applied as packaging materials and that 90 percent of this ends up as a component of urban garbage. It has also been estimated that recalcitrant plastic accumulates in our environment at a rate of 25 million tons per year.

Burning of plastics is an unsatisfactory disposal solution, since this tends to damage incinerators due to the large quantity of heat generated during combustion and the adverse effects from the discharged smoke that adds to air pollution and destruction of the ozone layer. Similarly plastics, unlike paper and cardboard, are not readily destroyed by natural means, such as degradation by microorganisms, which degrade most other forms of organic matter and return such matter to the biological life cycle. Thus, burial in a waste site is also not an effective means of disposal. The resulting accumulation of plastics in our environment has tended to result in landfills becoming filled to capacity; unsightly litter destroying the scenery and landscape; and destruction of the living environment for marine life and other forms of life.

In an effort to resolve the environmental problem, additives have been combined in certain ways with the polymeric compositions used to make plastics to increase the rate at which the plastic is degraded to environmentally friendly compounds. These additives, commonly called degradants, increase the rate of degradation of the plastic by increasing the rate of photodegradation, biological degradation, and/or chemical degradation.

Photodegradation involves the natural tendency for most polymers to undergo gradual reaction with atmospheric oxygen, particularly in the presence of light. Typically, a photosensitizing agent is employed in order to accelerate this natural tendency. The photosensitizing additive absorbs ultraviolet light (e.g., from sunlight) and the additive, in the photo-excited state, then undergoes a chemical reaction that leads to the generation of free radicals, which leads to an auto-oxidation and eventual disintegration of the plastic. Photodegradation has generally involved two technological approaches: (a) introduction of photosensitive functional group into the polymer; or (b) adding of photosensitive reagents to the polymer. A copolymer of ethylene and carbon monoxide, such as those commercially available from Dow Chemical Co., DuPont Co., Union Carbide Co., and Bayer Co., or the vinyl ketone copolymer commercially available from Ecoplastics Co. are examples of introducing a photosensitive functional group into the polymer. The approach of adding photosensitive reagents is exemplified by the commercially available polymers of Ampacet Co. and Ideamasters Co. that contain an added metal complex, such as that developed by Scott-Gilead Co. as disclosed in U.S. Pat. No. 4,360,606. The thermal oxidation that follows the initial photochemical initiation step may be accelerated by the addition of auto-oxidizable substances. The auto-oxidizable substances may also increase the rate or efficiency of the photochemical step.

Biodegradable plastics developed so far include, as the degradable material, polymeric products of microorganisms such as poly-$\beta$-hydroxybutylate, polymers synthesized from biochemicals produced by microorganisms, chemically synthesized aliphatic polyesters, or naturally synthesized polymers, such as starch or chitin.

U.S. Pat. No. 3,840,512 discloses thermoplastic compositions containing a metal salt of a fatty acid and a free carboxylic acid. Compression molded films which included both the metal salt of a fatty acid and a free carboxylic acid exhibited shorter times before the film became embrittled when exposed to light than films containing only the metal prodegradant.

U.S. Pat. No. 3,941,759 discloses a degradable plastic containing an organic photosensitizer and at least one organic derivative of a transition metal. Degradation is initiated by a photo-oxidative reaction of the photosensitizer and is sustained by the organic derivative of a transition metal. The plastic will continue to oxidize in the dark after an initial exposure to ultraviolet light.

U.S. Pat. No. 3,994,855 discloses thermoplastic polymers or copolymers of $\alpha$-olefins containing one or more transition metals. The polymer compositions are degraded under the action of sunlight and/or ultraviolet light and may also be subject to thermal degradation.

U.S. Pat. No. 4,101,720 discloses a degradable plastic composition that includes an organic polymeric material having dispersed therein at least one organic derivative of a transition metal and at least one readily autoxidizable organic material.

U.S. Pat. No. 4,156,666 discloses a degradable polyolefin resin comprising a polyolefin, a fatty acid or ester of a fatty acid and a monohydric aliphatic alcohol, and optionally an inorganic filler. The resins are molding resins and degrade when subjected to sunlight.

U.S. Pat. No. 4,256,851 discloses a degradable plastic composition comprising an organic polymeric material having dispersed therein at least one ethylenically unsaturated alcohol or ethylenically unsaturated ester derived therefrom as a readily autoxidizable substance.

U.S. Pat. No. 4,360,606 discloses a plastic composition containing an organic photosensitizer and at least one readily autoxidizable organic substance. Exposure of the polymeric material to an artificial source of light or sunlight initiates a chemical degradation process. The initial photochemical reaction is followed by susbequent reactions that are essentially thermal (i.e., non-photochemical). The readily autoxidizable substance accelerates the thermal autoxidation step that follows the initial photochemical step.

U.S. Pat. No. 4,461,853 discloses a controllably degradable vinyl polymer composition that contains a complex of two different metals. A combination of iron and nickel compounds provides enhanced photodegradation of the polymer composition.

U.S. Pat. No. 4,476,255 discloses a plastic composition containing a photosensitizer. Exposure of the plastic composition to natural sunlight or artificial sources of ultraviolet light initiates degradation of the composition.

U.S. Pat. No. 4,517,318 discloses a photodegradable styrene resin that comprises a styrene resin and at least one photodegradable agent selected from benzophenone, anthroquinone, fluorene, xanthone, phenylalkyl ketones, phenacyl halides, and derivatives of these compounds and optionally at least one photodegradable accelerator.

U.S. Pat. No. 4,931,488 discloses thermoplastic polymer compositions that include a biodegradable substance, such as starch; a transition metal compound; and a fatty acid or ester of a fatty acid. The compositions may further include one or more other transition metal compounds to catalyze degradation of the polymer. The polymer compositions are degraded under the action of heat and/or ultraviolet light.

U.S. Pat. No. 4,983,645 discloses that the addition of camphorquinone to polyethylene accelerates the photodegradation of the polymer when the polymer is exposed to ultraviolet light.

U.S. Pat. No. 5,091,262 discloses a biodegradable multilayer polyethylene film produced by a conventional extrusion process. The inner layer of the film contains about 3 to 40 percent starch and the exterior layers comprise polyethylene and at least one prodegradant to facilitate degradation of the outer layers and expose the starch filled inner layers.

U.S. Pat. No. 5,096,939 discloses a polymeric composition with enhanced reactivity toward oxidative and/or photooxidative degradation. The rate of degradation is enhanced by incorporating at least one alkoxylated ethylenically unsaturated compound as an organic photosensitizer. The compositions may further include other readily oxidizable substances.

U.S. Pat. No. 5,134,193 discloses a polyethylene copolymer modified to contain chromomorphic moieties, which absorb at wavelengths greater than 200 nm, such as para-substituted benzenes and anthracenes, chemically bonded thereto. The copolymer, when added to virgin polyethylene renders the composition more susceptible to ultraviolet radiation.

U.S. Pat. No. 5,145,779 discloses a process for degrading $C_2$ to $C_8$ alpha olefin starch containing polymers with lignin degrading microorganisms.

U.S. Pat. No. 5,258,422 discloses compostable and biodegradable thermoplastic compositions comprising a thermoplastic polymer, a hydrolytically unstable antioxidant, a pro-oxidant, an accelerator, and a property modifier.

U.S. Pat. No. 5,308,906 discloses an extrudable elastomeric composition composed of an elastomer A-B-A' block copolymer, where A and A' are each a thermoplastic polymer endblock and B is a conjugated diene monomer having a low degree of residual ethylenic unsaturation, a polyolefin, and an effective amount of transition metal compound distributed in the blend of the polyolefin and block copolymer. The elastomeric composition degrades in thermally oxidative environments.

U.S. Pat. No. 5,378,738 discloses a biodegradable plastic produced by adding a substance that imparts a hydrophilic property to the plastic so that the plastic is decomposed by Blasidomycetes.

U.S. Pat. No. 5,444,107 discloses a degradable polymer composition consisting essentially of a thermoplastic polymer composition comprising primarily polylactic acid or a copolymer of lactic acid and another hydroxy-carboxylic acid and starch and/or modified starch. The degradation rate of the polymer composition is controlled by the varying the amount of starch and/or modified starch.

U.S. Pat. No. 5,461,093 discloses a biodegradable polyethylene composition. The composition includes starch chemically bonding to polyethylene with a coupling agent, a radical initiator, a Lewis acid, an autooxidizing agent, and a plasticizer.

U.S. Pat. No. 5,565,503 discloses a film of a biodegradable polyolefin resin. The resin contains fillers selected from the group including inorganic carbonate, synthetic carbonates, nepheline syenite, magnesium hydroxide, aluminum trihydrate, diatamaceous earth, mica, natural or synthetic silicas, calcined clay, or mixtures thereof and a metal carboxylate as a prodegradant.

U.S. Pat. No. 5,854,304 discloses a chemically degradable/compostable additive package or concentrate that is added to polyolefins. The additive package is a combination of a metal carboxylate and an aliphatic poly hydroxy-carboxyl acid.

U.S. Pat. No. 5,861,461 discloses a biodegradable plastic composition characterized in that a thermoplastic modified starch is chemically bonded by the use of a coupling agent to a matrix resin of polyethylene and a biodegradable polyester.

U.S. Pat. No. 5,866,634 discloses a biodegradable polymer composition comprising polylactic acid mixed with a polyester type biodegradable polymer.

U.S. Pat. No. 5,973,024 discloses a biodegradable plastic composition and a method for controlling the rate of biodegradation of the biodegradable plastic. The rate of degradation is controlled by adding a carbodiimide compound to the biodegradable plastic. The carbodiimide is mixed into the plastic by dissolving the plastic and carbodiimide in an organic solvent and then removing the organic solvent by distillation or by mixing the carbodiimide with the plastic by melt-kneading.

WO 88/09354 discloses a degradable polymer composition that is a blend of a normally stable chemically saturated polymer and a less stable chemically unsaturated polymer or copolymer, an anti-oxidant active over a limited period of time, and a latent pro-oxidant, such as an organic salt of a transition metal.

WO 92/11298 discloses a photodegradable thermoplastic composition that includes a first transition metal compound, a second transition metal compound, and an aromatic ketone. The second transition metal compound acts as a catalyst with the first transition metal compound to enhance degradation of the thermoplastic material. The aromatic ketone has a synergistic effect that increases photodegradation of the plastic.

WO 94/13735 discloses a degradable thermoplastic compositions. The compositions include a thermoplastic polymer component combined with a directly biodegradable component, an oxidizable component, transition metal additives, and an aromatic ketone. The polymeric material degrades in three stages. The first stage is biological removal of the directly biodegradable component which results in mass reduction and a highly porous material. The second stage is chemical and results in oxidative shortening of the long polymer chains to decrease their molecular weight and the third stage involves biological metabolism of the low molecular weight fragments.

The one or more degradants are often added to virgin polymer compositions by melting pellets or powder of the virgin polymer and adding the degradants to the melted polymer, mixing the degradants and polymer in an extruder to disperse the degradants within the polymer, and extruding the mixture into pellets or other useable form of the polymer. Typically the degradants are added in an amount of about 0.5 to 2 percent based on the weight of the polymer. The resulting extruded polymer containing the degradants is then used in latter manufacturing operations such as, extrusion, film blowing, or molding to produce a final article. The process of melting the polymer to add the degradants, however, is expensive. For example, the remelting step includes the high energy costs associated with providing sufficient heat to remelt the polymer and the manpower costs to perform the remelting step. Moreover, the process is detrimental to the quality of the final polymer blend itself, since each event of heating and melting a polymer adds to the heat history of the polymer and tends to result in some degradation of the polymer.

More often, the one or more degradants are added to virgin polymer by master batching. Master batching involves adding a package that includes the degradants in the form of a master batch to the virgin polymer. A master batch is a blend of the polymer containing high concentrations of the degradants. The master batch is prepared by the process described above except that higher concentrations of degradants are added to the virgin polymer. Typically a master batch contains between about 5 to 20 percent of the degradants by weight of the polymer and may contain as much as 30 percent of the degradants by weight of the polymer. Polymer compositions for final use, having the desired lower concentration of degradants, are then prepared by combining remelted virgin polymer and remelted polymer from the master batch in a ratio so as to provide a desired final concentration. Typically the weight ratio of virgin polymer to master batch is about 5:1. An extruder, such as a twin screw extruder, is typically used to mix the two polymer compositions and to disperse the master batch degradants throughout the virgin polymer. The resultant mixture is then extruded into pellets or other useable form of the polymer for use in latter manufacturing operations such as, extrusion, film blowing, or molding to produce a final article.

The process used to make the master batch, however, involves melting the polymer to add the degradants and, thus, includes all the disadvantages discussed above that are associated with remelting a polymer to add a degradant. Moreover, combining a master batch with a virgin polymer has numerous other disadvantages. For example, it is difficult to homogeneously distribute the degradant throughout the final polymer mix, since it is difficult to thoroughly mix two polymer melts. Furthermore, master batches are inconvenient to use since, due to the high concentrations of degradants, they are susceptible to decomposition and therefore can only be stored for a limited length of time. Thus, they must often be ordered and shipped immediately prior to use. Furthermore, the high concentrations of degradants present in the master batch typically leads to deterioration of the polymer in the master batch and, thus, results in a final polymer that is of inferior quality. This is especially true when the polymer is subjected to the high temperatures necessary for extrusion or film blowing.

The difficulty in obtaining a polymer of high quality and the high costs associated with preparing polymers containing degradants has been a barrier to these products becoming commercially available. Thus, there is a need for improved methods of preparing polymer compositions containing degradants that are more cost effective and that produce a higher quality product. The current invention provides such a process.

SUMMARY OF THE INVENTION

The present invention is directed to a method for manufacturing a polymer component containing a degradant component. The method includes the steps of polymerizing one or more monomers to provide a fluid polymer component, and directly combining the fluid polymer component and degradant component to form a blend and to distribute the degradant component substantially homogeneously throughout the fluid polymer component. The method may further include the step of solidifying the blend sufficiently to inhibit further distribution of the degradant component in the blend. The combining may be accomplished with an extruder.

The degradant component may be added in an amount of about 0.01 to 10 percent by weight of the polymer composition, preferably in an amount of about 0.1 to 5 percent by weight of the polymer composition, and more preferably in an amount of about 0.5 to 2 percent by weight of the polymer composition. The degradant component may be one or more of a photodegradant, a biodegradant, or a chemical degradant. The photodegradant may be one or more of aliphatic or aromatic ketones, quinones, peroxides, hydroperoxides, azo compounds, organic dyes, latent sensitizers, aromatic hydrocarbons, or mixtures thereof. The biodegradant may be one or more of chitin, starch, cellulose, glucose derivatives, polysaccharides, poly-β-hydroxybutylate, poly caprolactone, polyesters, carbodiimides, or mixtures thereof. The chemical degradant may be one or more of a combination of a metal carboxylate and an aliphatic poly hydroxy-carboxyl acid, a combination of metal carboxylate and filler, or a transition metal complex. The photodegradant may be further combined with one or more of an auto-oxidizable substance selected from the group consisting of olefinic materials, ethers, acetals, ketals, amines, aldehydes, natural oils, unsaturated fatty acids, natural and synthetic resins, and mixtures thereof. Preferably, the degradant component and fluid polymer component are homogeneously distributed. The degradant component may be a liquid.

The polymer component may be at least one of (i) homo- and copolymers of monoolefins and diolefins; (ii) copolymers of one or more monoolefins and/or diolefins with carbon monoxide and/or with other vinyl monomers; (iii) hydrocarbon resins including hydrogenated modifications thereof; (iv) homo- and copolymers of styrenes; (v) copolymers of one or more styrenes with other vinyl monomers; (vi) graft copolymers of styrenes on polybutadienes, polybutadiene/styrene copolymers, and polybutadiene/ acrylonitrile copolymers; styrene or α-methylstyrene and acrylonitrile or methacrylonitrile on polybutadiene; styrene and maleic anhydride on polybutadiene; styrene, acrylonitrile and maleic anhydride or maleimide on polybutadiene; styrene and acrylonitrile on ethylene/propylene/diene copolymers; styrene and acrylonitrile on polyalkyl acrylates or methacrylates; and styrene and acrylonitrile on acrylate/ butadiene copolymers; (vii) halogen-containing polymers; (viii) homo- and copolymers derived from α,β-unsaturated acids and derivatives thereof; (ix) copolymers of homo- and copolymers derived from α,β-unsaturated acids and derivatives thereof with other unsaturated monomers; (x) homo- and copolymers derived from unsaturated alcohols and amines or the acyl derivatives or acetals thereof, and copolymers of these monomers with other ethylenically unsaturated monomers; (xi) homo- and copolymers of cyclic ethers and copolymers of these with bisglycidyl ethers; (xii) polyacetals; polyoxymethylenes which contain ethylene oxide as a comonomer; and polyoxymethylenes modified with thermoplastic polyurethanes, acrylates and/or MBS; (xiii) polyphenylene oxides and sulfides; (xiv) polyurethanes derived from hydroxy-functional components with aliphatic and/or aromatic isocyanates; (xv) polyamides and copolyamides derived from diamines, dicarboxylic acids, and/or aminocarboxylic acids or the corresponding lactams, with or without an elastomer as a modifier; block copolymers of polyamides with polyolefins, olefin copolymers, ionomers, chemically bonded or grafted elastomers, or polyethers; and polyamides condensed during processing (RIM polyamide systems); (xvi) polyureas, polyimides, polyamide-imides, polyetherimides, polyesterimides, polyhydantoins, and polybenzimidazoles; (xvii) polyesters derived from dicarboxylic acids, diols, and/or hydroxycarboxylic acids or the corresponding lactones; block copolyether esters derived from hydroxyl-terminated ethers; PETG; PEN; PTT; and polyesters modified with polycarbonate or MBS; (xviii) polycarbonates and polyester carbonates; (xix) polysulfones, polyether sulfones, and polyether ketones; (xx) crosslinked polymers derived from aldehyde condensation resins; (xxi) drying and non-drying alkyd resins; (xxii) unsaturated polyester resins derived from copolyesters of saturated and unsaturated dicarboxylic acids with polyhydric alcohols and vinyl compounds as crosslinking agents and halogen-containing modifications thereof; (xxiii) crosslinkable acrylic resins derived from substituted acrylates; (xiv) alkyd resins, polyester resins, and acrylate resins crosslinked with melamine resins, urea resins, isocyanates, isocyanurates, carbamates, or epoxy resins; (xxv) crosslinked epoxy resins derived from aliphatic, cycloaliphatic, heterocyclic, and/or aromatic glycidyl compounds which are crosslinked with hardeners; (xxvi) polysiloxanes; (xxvii) Michael addition polymers of amines or blocked amines with activated unsaturated and/or methylene compounds; (xxviii) polyketimines in combination with unsaturated acrylic polyacetoacetate resins or unsaturated acrylic resins; (xxix) radiation curable compositions containing ethylenically unsaturated monomers or oligomers and a polyunsaturated aliphatic oligomer; and (xxx) epoxymelamine resins such as light-stable epoxy resins cross-linked by an epoxy functional coetherified high solids melamine resin. In one embodiment the monomers comprise at least one of ethylene, propylene, styrene, or mixtures thereof. Preferably, the polymer component is substantially free of an inhibitor component.

The method may further include combining an inhibitor component with the fluid polymer in an amount sufficient to inhibit degradation of the polymer during processing. The inhibitor component may be added in an amount of between about 0.05 to 5 percent by weight of the polymer. The inhibitor component may also be added to the fluid polymer in an amount sufficient to inhibit degradation of the polymer during processing and for a specified amount of time after processing so that the polymer begins to degrade after the inhibitor component is depleted, wherein the specified amount of time after processing is the effective working life of the polymer. The inhibitor component may be an antioxidant. A nonreactive additive may also be added to the fluid polymer. The non-reactive additive may be processing aid, viscosity depressant, mold-release agent, anti-blocking agent, emulsifier, slip agent, anti-static agent, fibrous reinforcement additive, filler, flame retardant, lubricant, plasticizer, adhesion promoter, dye, pigment, or mixture thereof.

The present invention is also directed at articles that include a polymer component prepared according to the method of the invention. The article may be a molded article, extruded article, film, tape, or fiber.

The invention is also directed at methods of making a polymer article containing a degradant component. The method includes the steps of polymerizing one or more monomers to provide a fluid polymer component, directly combining the fluid polymer and degradant component to form a blend and to distribute the degradant component substantially homogeneously throughout the fluid polymer component, solidifying the blend of the fluid polymer component and degradant component, and forming the solidified blend into a polymeric article. The forming may involve the steps of remelting the solidified blend and shaping the blend into an article. The shaping may be accomplished by one or more of extrusion, extrusion blowing, film casting, film blowing, calendering, injection molding, blow molding, compression molding, thermoforming, or rotational casting.

DETAILED DESCRIPTION OF THE PREFERRED EMBODIMENTS

The present process is used to prepare polymers that are degradable. The process of the present invention combines a polymer component with a degradant component immediately after the polymer has been synthesized. The process involves the steps of polymerizing one or more monomers to provide a fluid polymer component; adding a degradant component to the fluid polymer component to form a blend of the fluid polymer component and the degradant component, preferably directly after the polymer has been synthesized; mixing the blend of fluid polymer component and degradant component so that the degradant component is substantially homogeneously distributed throughout the fluid polymer component. The blend of the fluid polymer and degradant component may then be solidified.

Importantly, the process of the present invention adds the degradant component immediately after the polymer has been synthesized. The phrase adding the degradant component "immediately after the polymer has been synthesized" means that the polymer remains in a molten state from the time it is synthesized to the point at which the degradant component is added. Although the degradant component is preferably added to the fluid polymer component immediately after the polymer has been synthesized, the invention does not preclude additional steps after the polymer has been synthesized such as, for example, a step wherein unreactive monomer is removed from the liquid polymer component. By adding the degradant component immediately after the polymer is synthesized, the process of the present invention avoids the undesirable need to remelt the polymer to add the degradant component and avoids the disadvantages associated with this remelting step. Most notably, a significant economic advantage is realized by avoiding the step of remelting the polymer. The remelting step is energy intensive and manpower intensive and, thus, costly. The process of the present invention realizes a substantial reduction in cost by avoiding this step. Moreover, a better quality polymer is produced by the process of the present invention. Eliminating the additional step of remelting the polymer means that the polymer is exposed to less heating and hence, the polymer suffers less thermal degradation. Moreover, the present invention facilitates substantially homogeneously distributing the degradant component in the fluid polymer. Thus, the process of the present invention is less expensive and provides a better quality polymer compared to prior art processes that require remelting the polymer to add the degradant component.

The present invention also provides numerous advantages over the prior art process of master batching to producing polymers containing degradants. Firstly, the process of the present invention completely avoids the use of a master batch and the disadvantages associated with using a master batch. For example, the process of the present invention is more cost effective since it avoids the step of making the master batch and, as discussed above, avoids an expensive remelting step wherein the master batch is combined with the virgin polymer. Also, since conventional master batches contain a high percent of degradant, typically between 5 and 20 percent, they tend to be extremely susceptible to degradation and cannot be stored for extended periods of time. This necessitates frequent delivery of the master batch and the associated shipping costs. The process of the present invention avoids these additional costs.

Moreover, the high percent of degradant in conventional master batches often leads to polymer degradation either before or during processing, such that the quality of the final product is compromised. Furthermore, combining a master batch with virgin polymer involves melting and mixing two melted polymers, i.e., the virgin polymer and the polymer of the master batch. Mixing two polymers, however, is much more difficult and is less effective at distributing the degradants substantially homogeneously through out the polymer. In order to facilitate homogenous mixing master batches are typically made of high melt index resins. Using high melt index resins, however, may compromise the quality of the final product if, for example, the properties of the master batch are different from that of the virgin polymer. In contrast, the process of the present invention, by adding the degradant component directly to the fluid polymer, avoids these problems. By adding the degradant component directly to the fluid polymer the invention obtains a more homogenous distribution of the degradant component throughout the polymer. Furthermore, the invention provides this homogenous distribution without having to add a master batch polymer that may have a melt index or other property that is different from that of the virgin polymer. According to the process of the invention the degradant component is substantially homogeneously distributed, preferably homogeneously distributed, in the fluid polymer. In addition, by avoiding multiple mixing steps, i.e., a mixing step to prepare the master batch and a mixing step to prepare the final polymer, the process of the present invention is more reproducible than the prior art process using a master batch. Yet another advantage of the process of the present invention is that small amounts stabilizers such as anti-oxidants can be added to the polymers to prevent degradation during processing. Preventing degradation of the polymer during processing by adding small amounts of stabilizers, however, is not possible with master batches, since the stabilizers are ineffective in the presence of the high concentration of degradants present in the master batch. Still another advantage of the process of the present invention is that it can be adapted to currently operating plants with no retooling or only minimal retooling.

Thus, the process of the present invention that adds a degradant component to a polymer component immediately after the polymer component has been synthesized provides numerous advantages over the prior art processes. In particular, the process of the present invention is more economical than the prior art processes and provides a better quality product. The cost for producing a polymer component containing a degradant component according to the process of the present invention can be kept to less than about 5 cents per kilogram of polymer more expensive than the cost of producing a conventional polymer without the degradant component added according to the invention. This increase in cost is nominal, especially considering that the final polymer component is of superior quality compared to a conventional polymers containing a degradant component that are produced by the prior art processes.

The polymer component produced by the process of the present invention may be used to produce any article that is typically manufactured from that type of polymer. For example, the polymer component may be used to manufacture plastic films, sheets, bags, bottles, styrofoam cups, plates, utensils, blister packages, boxes, package wrappings, plastic fibers, tapes, twine agricultural films, disposable diapers, disposable garments, and the like.

The articles may be manufactured by any process available to those of ordinary skill in the art including, but not limited to, extrusion, extrusion blowing, film casting, film blowing, calendering, injection molding, blow molding, compression molding, thermoforming, and rotational casting.

By "degradant component" is meant any additive or mixture of additives that, when added to the polymer, increases the rate of polymer degradation.

The term "degradable" or "degradation" is intended to mean that the polymer undergoes an irreversible process that leads to a significant change in the chemical and/or physical structure of the material that is typically characterized by a loss of physical or chemical properties, such as integrity, molecular weight, molecular structure, mechanical strength, and/or fragmentation. Preferably, the polymer is degraded to a benign non-toxic material that is not harmful to the environment.

The mixing of fluid polymer and degradant component may be accomplished by any method available to one of ordinary skill in the art including, for example, by using a roll mill or an extruder. Preferably, the mixing is accomplished by extruding the polymer. Any type of extruder may be used. Preferably a twin screw extruder is used since this tends to provide the best mixing. The solidified blend of polymer and degradant component may be prepared in the form of pellets, strands, or a powder, for example,.

The degradant component may increase the rate of degradation of the polymer by a process that involves one or more of, for example, photodegradation, biodegradation, or chemical degradation. In addition, mechanical forces such as erosion may further help degrade the polymer. Photodegradation means a process of degradation that is initiated by exposure of the polymer to natural or artificial light. Biodegradation means a process of degradation that occurs as a result of the action of enzymes, derived from the metabolic processes of microorganisms or other living species, on the polymer. Chemical degradation means a process of degradation wherein chemical bonds in the polymer are broken as a result of one or more chemical reactions such as, for example, hydrolysis, thermal cleavage, or oxidation. Chemical degradation is thus more encompassing than photodegradation, since the reactions are not limited to those initiated by exposure to light. It is possible that a given mechanism of degradation may be classified as more than one of the above-described processes.

The polymer component may be any polymer or mixture of polymers. The term "polymer component" or "polymeric material" includes, but is not limited to, homopolymers; copolymers, such as, for example, block, graft, random, and alternating copolymers, terpolymers, etc.; and blends and modifications thereof. Furthermore, the term polymer includes all possible geometrical configurations of the material including, but not limited to, isotactic, syndiotactic, isomeric, and random symmetries.

Non-limiting examples of specific polymers that may be used in the process of the invention, include, but are not limited to, materials in the following categories, or combinations thereof:

1. Homo- and copolymers of monoolefins and diolefins, including but not limited to, isobutylene, butene, methylpentene, hexene, heptene, octene, isoprene, butadiene, hexadiene, dicyclopentadiene, ethylidene, and cycloolefins such as cyclopentene and norbornene;
2. Copolymers of one or more monoolefins and/or diolefins with carbon monoxide and/or with other vinyl monomers, including but not limited to acrylic and methacrylic acid, acrylates and methacrylates, acrylamides, acrylonitriles; styrenes, vinyl acetate (such as ethylene/vinyl acetate copolymers), vinyl halides, vinylidene halides, maleic anhydride, and allyl monomers such as allyl alcohol, allyl amine ally glycidyl ether, and derivatives thereof;
3. Hydrocarbon resins (such as $C_5$–$C_9$) including hydrogenated modifications thereof and mixtures of polyalkylenes and starch;
4. Homo- and copolymers of styrenes such as styrene, p-methylstyrene and α-methylstyrene;
5. Copolymers of one or more styrenes with other vinyl monomers such as olefins and diolefins (e.g., ethylene, isoprene and/or butadiene); acrylic and methacrylic acid; acrylates and methacrylates; acrylamides; acrylonitriles; vinyl acetate (such as ethylene/vinyl acetate copolymers); vinyl halides; vinylidene halides; maleic anhydride; and allyl compounds such as allyl alcohol, allyl amine allyl glycidyl ether, and derivatives thereof; examples include styrene acrylonitrile (SAN) and acrylate styrene acrylonitrile (ASA);
6. Graft copolymers of styrenes on polybutadienes, polybutadiene/styrene copolymers, and polybutadiene/acrylonitrile copolymers; styrene (or α-methylstyrene) and acrylonitrile (or methacrylonitrile) on polybutadiene; styrene and maleic anhydride on polybutadiene; styrene, acrylonitrile and maleic anhydride or maleimide on polybutadiene; styrene and acrylonitrile on ethylene/propylene/diene copolymers; styrene and acrylonitrile on polyalkyl acrylates or methacrylates; and styrene and acrylonitrile on acrylate/butadiene copolymers;
7. Halogen-containing polymers such as polychloroprene; chlorinated rubbers; chlorinated and brominated isobutylene/isoprene copolymers; chlorinated or sulfochlorinated polyethylene; copolymers of ethylene and chlorinated ethylene; epichlorohydrin polymers and copolymers; and polymers and copolymers of halogen-containing vinyl compounds such as vinyl chloride, vinylidene chloride, vinyl fluoride, and/or vinylidene fluoride and other vinyl monomers;
8. Homo- and copolymers derived from α,β-unsaturated acids and derivatives thereof such as acrylic acid, methacrylic acid, acrylates, methacrylates, acrylamides, and acrylonitriles;
9. Copolymers of the monomers mentioned in (8) with other unsaturated monomers such as olefins and diolefins (e.g., butadiene); styrenes; vinyl halides; maleic anhydride; and allyl monomers such as allyl alcohol, allyl amine, allyl glycidyl ether, and derivatives thereof;
10. Homo- and copolymers derived from unsaturated alcohols and amines or the acyl derivatives or acetals thereof, such as vinyl alcohol, vinyl acetate, vinyl stearate, vinyl benzoate, vinyl maleate, vinyl butyral, allyl alcohol, allyl amine, allyl glycidyl ether, allyl phthalate, and allyl melamine; as well as copolymers of such monomers with other ethylenically unsaturated monomers mentioned above;
11. Homo- and copolymers of cyclic ethers such as alkylene glycols and alkylene oxides (e.g., polypropylene oxide and polyethylene oxide), as well as copolymers with bisglycidyl ethers;
12. Polyacetals such as polyoxymethylene and those polyoxymethylenes which contain ethylene oxide as a comonomer; and polyoxymethylenes modified with thermoplastic polyurethanes, acrylates and/or MBS;
13. Polyphenylene oxides and sulfides;
14. Polyurethanes derived from hydroxy-functional components such as polyhydric alcohols, polyethers, polyesters, polyacrylics, and/or polybutadienes, with aliphatic and/or aromatic isocyanates, as well as precursors thereof;
15. Polyamides and copolyamides derived from diamines, dicarboxylic acids and/or aminocarboxylic acids or the corresponding lactams, such as polyamide 4, polyamide 6, polyamide 6/6, polyamide 6/10, polyamide 6/9, polyamide 6/12, polyamide 4/6, polyamide 12/12, polyamide 11 and polyamide 12; aromatic polyamides starting from m-xylene diamine and adipic acid; polyamides prepared from hexamethylene diamine and isophthalic and/or terephthalic acid, with or without an elastomer as a modifier, for example, poly-2,4,4-trimethylhexamethylene terephthalamide or poly-m-phenylene isophthalamide; block copolymers of the aforementioned polyamides with polyolefins, olefin copolymers, ionomers, chemically bonded or grafted elastomers, or polyethers such as polyethylene glycol, polypropylene glycol, or polytetramethylene glycol; and polyamides condensed during processing (RIM polyamide systems);
16. Polyureas, polyimides, polyamide-imides, polyetherimides, polyesterimides, polyhydantoins, and polybenzimidazoles;
17. Polyesters derived from dicarboxylic acids, diols and/or hydroxycarboxylic acids or the corresponding lactones, such as polyethylene terephthalate, polybutylene terephthalate, poly-1,4-dimethylcyclohexane terephthalate and polyhydroxybenzoates, as well as block copolyether esters derived from hydroxyl-terminated ethers; PETG; PEN; PTT; and also polyesters modified with polycarbonate or MBS;
18. Polycarbonates and polyester carbonates;
19. Polysulfones, polyether sulfones, and polyether ketones;
20. Crosslinked polymers derived from aldehyde condensation resins such as phenol/formaldehyde resins, urea/formaldehyde resins, and melamine/formaldehyde resins;
21. Drying and non-drying alkyd resins;
22. Unsaturated polyester resins derived from copolyesters of saturated and unsaturated dicarboxylic acids with polyhydric alcohols and vinyl compounds as crosslinking agents and halogen-containing modifications thereof;
23. Crosslinkable acrylic resins derived from substituted acrylates such as epoxy acrylates, hydroxy acrylates, isocyanato acrylates, urethane acrylates, or polyester acrylates;
24. Alkyd resins, polyester resins, and acrylate resins crosslinked with melamine resins, urea resins, isocyanates, isocyanurates, carbamates, or epoxy resins;
25. Crosslinked epoxy resins derived from aliphatic, cycloaliphatic, heterocyclic, and/or aromatic glycidyl compounds such as bisphenol A and bisphenol F, which are crosslinked with hardeners such as anhydrides or amines;
26. Polysiloxanes;
27. Michael addition polymers of amines or blocked amines (e.g., ketimines) with activated unsaturated and/or methylene compounds such as acrylates and methacrylates, maleates, and acetoacetates;
28. Polyketimines in combination with unsaturated acrylic polyacetoacetate resins or with unsaturated acrylic resins including urethane acrylates, polyether acrylates, vinyl or acryl copolymers with pendant unsaturated groups, and acrylated melamines;
29. Radiation curable compositions containing ethylenically unsaturated monomers or oligomers and a polyunsaturated aliphatic oligomer;
30. Epoxymelamine resins such as light-stable epoxy resins cross-linked by an epoxy functional coetherified high solids melamine resin.

Mixtures of one or more polymers are also contemplated for use in the process of the present invention. Preferred polymers for use in the process of the present invention include polymers or copolymers of ethylene, propylene, styrene, and mixtures thereof. More preferred polymers are polyethylenes (which optionally can be crosslinked or functionalized), such as high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), and branched low density polyethylene (BLDPE); polypropylene; polystyrene; or blends thereof.

Any degradant component available to those of ordinary skill in the art may be added to the polymer according to the process of the present invention. The degradant component may be, for example, one or more of a photodegradant or photosensitizer, a biodegradant, or a chemical degradant. For example, any of the degradant components disclosed in U.S. Pat. Nos. 3,840,512, 3,941,759, 3,994,855, 4,101,720, 4,156,666, 4,256,851, 4,360,606, 4,461,853, 4,476,255, 4,517,318, 4,931,488, 4,983,645, 5,091,262, 5,096,939, 5,134,193, 5,145,779, 5,258,422, 5,308,906, 5,378,738, 5,444,107, 5,461,093, 5,565,503, 5,854,503, 5,861,461, 5,866,634, 5,973,024; WO 88/09354; WO92/11298; and WO 94/13735, the contents of which are expressly incorporated herein by reference, may be used in the process of the present invention.

By "photodegradant" or "photosensitizer" is meant an additive that causes photodegradation. Typically, the photodegradant functions by absorbing ultraviolet or visible light to become photo-excited; in the photo-excited state the photodegradant is capable of initiating other reactions, such as photo-oxidation, photo-polymerization, photo-isomerization, and the like, that result in the polymer degrading. By "biodegradant" is meant an additive that causes biodegradation. By "chemical degradant" is meant an additive that causes chemical degradation.

Examples of suitable photosensitizers for use according to the invention include, but are not limited to, aliphatic or aromatic ketones, such as benzophenone, benzoin, anthrone, and deoxyanisoin; quinones, such as 2-methylanthroquinone, 2-chloroanthroquinone, 2-ethylanthroquinone, and camphorquinone; peroxides and hydroperoxides such as dicumyl peroxide, dilauroyl peroxide, 2,5-dimethyl-2,5-di (t-19-butylperoxy)hexyne-3, and α,α'-bis(t-butylperoxy)diisoproprylbenzene; azo compounds; organic dyes, such as acridine yellow and Rhodamine B Base; latent sensitizers; aromatic hydrocarbons; and mixtures thereof. An extensive list of suitable photosensitizers is provided in U.S. Pat. No. 4,476,255, the contents of which are expressly incorporated herein by reference. The photosensitizer may further be combined with one or more of an auto-oxidizable substance such as olefinic materials, ethers, acetals, ketals, amines, aldehydes, natural oils, unsaturated fatty acids, natural and synthetic resins, or combination thereof. An extensive list of suitable auto-oxidizable substance is disclosed in U.S. Pat. No. 4,360,606, the contents of which are expressly incorporated herein by reference.

Examples of suitable biodegradants include, for example, chitin, starch, cellulose and other glucose derivatives, polysaccharides, poly-β-hydroxybutylate, poly caprolactone, polyesters such as poly lactic acid, carbodiimides, and combinations thereof.

Examples of suitable chemical degradants include, for example, combinations of a metal carboxylate and an aliphatic poly hydroxy-carboxyl acid, as disclosed in U.S. Pat. No. 5,854,304, the contents of which are expressly incorporated herein by reference; combinations of metal carboxylates and fillers, such as those disclosed in U.S. Pat. No. 5,565,503, the contents of which are expressly incorporated herein by reference; and transition metal complexes, such as those disclosed in U.S. Pat. No. 5,308,906, the contents of which are expressly incorporated herein by reference.

Preferably a combination of different types of degradants are added to the polymer so that degradation of the polymer may occur by more than one process. The preferred degradation component is the degradation component disclosed in WO 94/13735, the contents of which are expressly incorporated herein by reference, containing a biodegradable component, an oxidizable component, a first transition metal component, a second transition metal component, and an oxidation promoting component.

The degradant component is typically added in an amount from about 0.01 to 10 percent, preferably about 0.1 to 5 percent, and more preferably about 0.5 to 2 percent by weight of the polymer for use in a final product. The degradant component may be a solid, such as in a powder or granulate form or in a pellitized form, or a liquid. Preferably, the degradant component is a liquid, since liquid degradant components are more easily dispersed throughout the polymer component.

Optionally, the polymer component may further include an inhibitor component or stabilizer. By "inhibitor component" or "stabilizer" is meant an additive or mixture of additives that decreases the rate of polymer degradation. Preferably, the polymer component is substantially free of an inhibitor component. The phrase "substantially free of an inhibitor component" as used herein means that the polymer component contains less than 10 percent by weight of an inhibitor component. In a preferred embodiment the phrase "substantially free of an inhibitor component" means that the polymer component contains less than 5 percent by weight of an inhibitor component. In a more preferred embodiment the phrase "substantially free of an inhibitor component" means that the polymer component contains less than 1 percent by weight of an inhibitor component. In the most preferred embodiment the phrase "substantially free of an inhibitor component" means that the polymer component contains less than 0.2 percent by weight of an inhibitor component.

When an inhibitor component is optionally added to the polymer component it may be, for example, a stabilizer such as an anti-oxidant, that permits high temperature processing without degradation of the polymer. The inhibitor component is are used to prevent degradation of the polymer during processing. For example, the severe processing conditions of extrusion and/or melt blowing can result in polymer degradation. The inhibitor component is added in an amount sufficient to prevent degradation of the polymer during processing. Typically the inhibitor component is added in an amount of from about 0.01 percent to about 10 percent by weight of the polymer, preferably about 0.05 to 5 percent by weight of the polymer, and more preferably from about 0.1 percent to about 1.5 percent by weight of the polymer. The inhibitor component may be added before the degradant component is added, after the degradant component is added, or simultaneously with the degradant component. The inhibitor component is consumed during processing of the polymer so that the final product contains only the degradant component and, thus, is degradable. The amount of inhibitor component that is added is dependent, in part, on how the polymer will be processed in the future to form a final product, however, the amount may be readily determined by one of ordinary skill in the art without undue experimentation.

It is also possible to add the inhibitor component in an amount sufficient to prevent degradation of the polymer during processing and for a specified amount of time after processing. The inhibitor component retards degradation during processing and for a limited period of time after processing and then, after the inhibitor component is depleted, the polymer begins to degrade. Preferably, the resulting polymer maintains its structural integrity while it is being used for its intended purpose, and then upon completion of that purpose breaks down under the action of the degradant component to reduce or avoid disposal problems with conventional polymers. The specified amount of time after processing is the effective working life of the polymer. By selecting the amount of inhibitor component and the amount of degradant component the useful lifetime of the polymer can be varied. The amount of inhibitor component and the amount of degradant component may be readily determined by one of ordinary skill in the art without undue experimentation.

Inhibitor components that may be used in the process of the invention include, but are not limited to, compounds that provides melt processing stability such as phosphites, hindered phenols, hydroxylamines, and lactones; compounds that provide long term stability such as hindered phenols, hindered amines, and thiosynergists; and compounds that provide UV light stability such as screeners, absorbers, excited state quenchers, and radical traps, for example. Mixtures of one or more inhibitor component may also be used in the process of the invention.

Preferably, the inhibitor component is an anti-oxidant. The term "anti-oxidant" means any stabilizer that inhibits degradation by preventing oxidation by molecular oxygen. Preferred anti-oxidants are hindered phenols such as 3,5-bis (1,1-dimethyl ethyl)-4-hydroxy-octadecyl ester, IRGANOX (commercially available from Ciba-Geigy Corporation of Deerfield, Ill.) and (4-methyl-1, 6-di(2-hydroxy-3-tertbutyl-5-methylbenzyl)-phenol, TOPANOL (commercially available from ICI Americas Inc. of Wilmington, De.) or a combination thereof. Both of these anti-oxidants are commonly used for stabilizing low density polyethylene materials. Other anti-oxidants that may be used according to the invention include 1,1,2-tris-4(2-tert-butyl-4-hydroxy-5-methyl)phenylpropane; BHT (butylated hydroxy toluene or di-tert-butyl-p-cresol); octadecyl 3,5-di-tert-butyl-4-hydroxycinnimate (Irganoxg® 1076, commercially available from Ciba-Geigy Corporation of Deerfield, Ill.); and the phosphorous containing anti-oxidants such as distearyl-pentaerythritol-diphosphite (WESTON® 618, commercially available from the General Electric Company of Berthoud, Co.), bis(2,4-di-tert-butylphenyl)pentaerythritol-diphosphite (ULTRANOX® 626, commercially available from General Electric Company of Berthoud, Co.), tris (nonyl phenyl)phosphite or TNPP (NAUGARD®, commercially available from Uniroyal Chemical Corporation of Middlebury, Conn. or POLYGUARD® commercially available from The Goodyear Tire and Rubber Company of Akron, Ohio), tetrakis(2,4-di-tertbutyl-phenyl)-4,4'-biphenylenediphosphonite (SANDOSTAB® P-EPQ, commercially available from Sandoz Agro Inc. of Des Plaines, Ill.), di-tert-butyl phosphonite condensation product with biphenyl or tetrakis(2,4-di-tert-butyl-phenyl)-4,4'-biphenylenediphosphonite (IRGAFROS® P-EPQ FF, commercially available from Ciba-Geigy Corporation of Deerfield, Ill.), tris(2,4-di-tert-butylphenyl)phosphite (IRGAFROS® 168,commercially available from Ciba-Geigy Corporation of Deerfield, Ill. or NAUGARD® 524, commercially available from Uniroyal Chemical Corporation of Middlebury, Conn.), and 2,2'-ethylenebis(4,6-di-tert-butylphenyl) fluorophosphonite (ETHANOX® X-398, commercially available from Ethyl Corporation of Richmond Va.), or combinations thereof.

The process of the present invention may further include adding other "non-reactive additives" to the polymer. By "non-reactive additives" is meant a chemical additive, filler, or reinforcement commonly used in the formulation of conventional polymeric compositions that does not result in degradation of the polymer. Any non-reactive additive available to those of ordinary skill in the art may be added in the process of the present invention. Examples of "non-reactive additives" include, but are not limited to processing aids; viscosity depressants; mold-release agents; emulsifiers; slip agents such as those commonly derived from amides of fatty acids; anti-blocking agents such as silica or talc; anti-static agents such as ethoxylated amines and quartenary amine salts; fibrous reinforcement additives; fillers such as barium sulfate, calcium carbonate, calcium silicate, fumed colloidal silica, glass, and clay; flame retardants; lubricants such as stearates of aluminum, calcium, magnesium, and tin, talc, and silicones; plasticizers such as low molecular weight poly(alkylene oxides) and organic plasticizers such as glycerol and sorbitol; adhesion promoters; dyes; pigments such as rutile and anatase titanium dioxides ($TiO_2$); and combinations thereof. The amount of non-reactive additive that is added to the polymer depends on the final use of the polymeric material and may readily be determined by one of ordinary skill in the art.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A method for manufacturing a polymer component containing a degradant component comprising the steps of:

polymerizing one or more monomer components selected from the group consisting of ethylene, propylene, styrene, and mixtures thereof to provide a fluid polymer component; and directly combining the fluid polymer component and degradant component immediately after the polymer has been synthesized and before the fluid polymer component solidifies to form a blend and to distribute the degradant component substantially homogeneously throughout the fluid polymer component.

2. The method of claim 1, further comprising the step of solidifying the blend sufficiently to inhibit further distribution of the degradant component in the blend.

3. The method of claim 1, wherein the combining is accomplished with an extruder.

4. The method of claim 1, wherein the degradant component is added in an amount of about 0.01 to 10 percent by weight of the polymer composition.

5. The method of claim 4, wherein the degradant component is added in an amount of about 0.1 to 5 percent by weight of the polymer composition.

6. The method of claim 5, wherein the degradant component is added in an amount of about 0.5 to 2 percent by weight of the polymer composition.

7. The method of claim 1, wherein the degradant component comprises one or more of a photodegradant, a biodegradant, or a chemical degradant.

8. The method of claim 7, wherein the photodegradant comprises one or more of aliphatic or aromatic ketones, quinones, peroxides, hydroperoxides, azo compounds, organic dyes, latent sensitizers, aromatic hydrocarbons, or mixtures thereof; the biodegradant comprises one or more of chitin, starch, cellulose, glucose derivatives, polysaccharides, poly-β-hydroxybutylate, poly caprolactone, polyesters, carbodiimides, or mixtures thereof; and the chemical degradant comprises one or more of a combination of a metal carboxylate and an aliphatic poly hydroxy-carboxyl acid, a combination of metal carboxylate and filler, or a transition metal complex.

9. The method of claim 8, wherein the photodegradant is further combined with one or more of an auto-oxidizable substance selected from the group consisting of olefinic materials, ethers, acetals, ketals, amines, aldehydes, natural oils, unsaturated fatty acids, natural and synthetic resins, and mixtures thereof.

10. The method of claim 1 wherein the degradant component and fluid polymer component are homogeneously distributed.

11. The method of claim 1, wherein the degradant component is a liquid.

12. The method of claim 1, wherein the polymer component is substantially free of an inhibitor component.

13. The method of claim 1, further comprising the step of combining an inhibitor component with the fluid polymer in an amount sufficient to inhibit degradation of the polymer during processing.

14. The method of claim 13, wherein the inhibitor component is added in an amount of between about 0.05 to 5 percent by weight of the polymer.

15. The method of claim 13, wherein the inhibitor component is an anti-oxidant.

16. The method of claim 1, further comprising the step of adding an inhibitor component to the fluid polymer in an amount sufficient to inhibit degradation of the polymer during processing and for a specified amount of time after processing so that the polymer begins to degrade after the one or more stabilizers is depleted, wherein the specified amount of time after processing is the effective working life of the polymer.

17. The method of claim 15, wherein the inhibitor component is an anti-oxidant.

18. The method of claim 1, further comprising the step of adding a non-reactive additive to the fluid polymer.

19. The method of claim 18, wherein the non-reactive additive comprises at least one of processing aids, viscosity depressants, mold-release agents, anti-blocking agents, emulsifiers, slip agents, anti-static agents, fibrous reinforcement additives, fillers, flame retardants, lubricants, plasticizers, adhesion promoters, dyes, pigments, or mixture thereof.

20. An article comprising a polymer component prepared according to claim 1.

21. The article of claim 20, wherein the article is a molded article, extruded article, film, tape, or fiber.

22. A method for manufacturing a polymer article containing a degradant component comprising the steps of:
   polymerizing one or more monomers to provide a fluid polymer component;
   directly combining the fluid polymer component and degradant component immediately after the polymer has been synthesized and before the fluid polymer component solidifies to form a blend and to distribute the degradant component substantially homogeneously throughout the fluid polymer component;
   solidifying the blend of the fluid polymer component and degradant component; and
   forming the solidified blend into a polymeric article.

23. The method of claim 22, wherein forming comprises the steps of: remelting the solidified blend; and shaping the blend into an article.

24. The method of claim 23, wherein the shaping is accomplished by one or more of extrusion, extrusion blowing, film casting, film blowing, calendering, injection molding, blow molding, compression molding, thermoforming, or rotational casting.

25. A method for manufacturing a polymer component containing a degradant component consisting essentially of the steps of:
   polymerizing one or more monomers to provide a fluid polymer; and
   directly combining the fluid polymer component and degradant component immediately after the polymer has been synthesized and before the fluid polymer component solidifies to form a blend and to distribute the degradant component substantially homogeneously throughout the fluid polymer component.

* * * * *